United States Patent [19]

Hollander

[11] 4,009,525

[45] Mar. 1, 1977

[54] APPARATUS FOR SIMULATION OF INTERPERSONAL RELATIONSHIPS AND ACTIVITY

[76] Inventor: James Fisher Hollander, 40 Middlesex St., Matawan, N.J. 07747

[22] Filed: Nov. 4, 1975

[21] Appl. No.: 628,830

[52] U.S. Cl. .............................................. 35/22 R
[51] Int. Cl.² ........................................ G09B 19/00
[58] Field of Search ........................... 35/22 R, 8 R

[56] References Cited

UNITED STATES PATENTS

| 3,166,857 | 1/1965 | Wood | 35/8 R X |
| 3,278,736 | 10/1966 | Pastoriza | 35/8 R UX |
| 3,328,803 | 6/1967 | Schwerin | 35/22 UX |
| 3,418,729 | 12/1968 | Ravich | 35/22 R |
| 3,600,826 | 8/1971 | Thomas | 35/22 R |
| 3,748,750 | 7/1973 | Viemeister | 35/22 R |
| 3,921,310 | 11/1975 | Smeda et al. | 35/22 R X |

OTHER PUBLICATIONS

"Punish/Reward:Learning With a Critic in Adaptive Threshold Systems," Widrow et al., IEEE Transactions on Systems, Man and Cybernetics, vol. SMC-3, No. 5, Sept. 1973, pp. 455–457.
"Group Behavior of Robots," M. Kochen, Computers and Automation, vol. 6, No. 3, 1957, pp. 16–21, 48.

*Primary Examiner*—Anton O. Oechsle

[57] ABSTRACT

Apparatus for simulating living beings interacting in pairs, small groups, and large groups.

A simulator of the man-woman relationship includes a simulator of the man and a simulator of the woman, each such individual simulator having adjustment dials relating to situational and personality factors. The dials adjust the voltage at a threshold detector which operates decision indicator lamps and provides a voltage at a decision voltage output port. The decision voltage output of the man-simulator is connected to the threshold detector of the woman-simulator via a sense port. Similarly, the woman-simulator has a decision voltage output port connected to a sense port and input to the level threshold detector of the man-simulator. A switch interrupts each output so that the effect of relationship can be shown. By adjustment and interpretation of the dial settings and decision indications, paradoxes and problems in man-woman relationships are demonstrated.

A plurality of individual simulator units are also employed with sense and decision ports interconnected to form simulators of partnerships, small groups, hierarchies, collective leadership, and large social groups.

In a social group simulator all decision ports are connected together for a social output and all sense ports are connected together for a social input. The social output is connected to a social condition display device. The social output is also connected to the social input via a feedback path disconnectable by a switch. A nonlinear device, a delay device, and/or a variable resistance are optionally placed in the feedback path for simulating nonlinear social perception, delayed responses to the social condition, and variable isolation of individuals from the social condition respectively.

A social group with variable population is simulated by switching individual simulators into or out of a social group simulator. Social interrelationships of subgroups and subcultures are simulated by interconnecting a plurality of social group simulators.

A social studies laboratory is arranged by locating individual simulators at respective student desks and connecting them by cables to a console at a teacher's desk where interconnection, adjustment, and display functions are performed.

45 Claims, 14 Drawing Figures

SMALL GROUP

HIERARCHY

COLLECTIVE LEADERSHIP

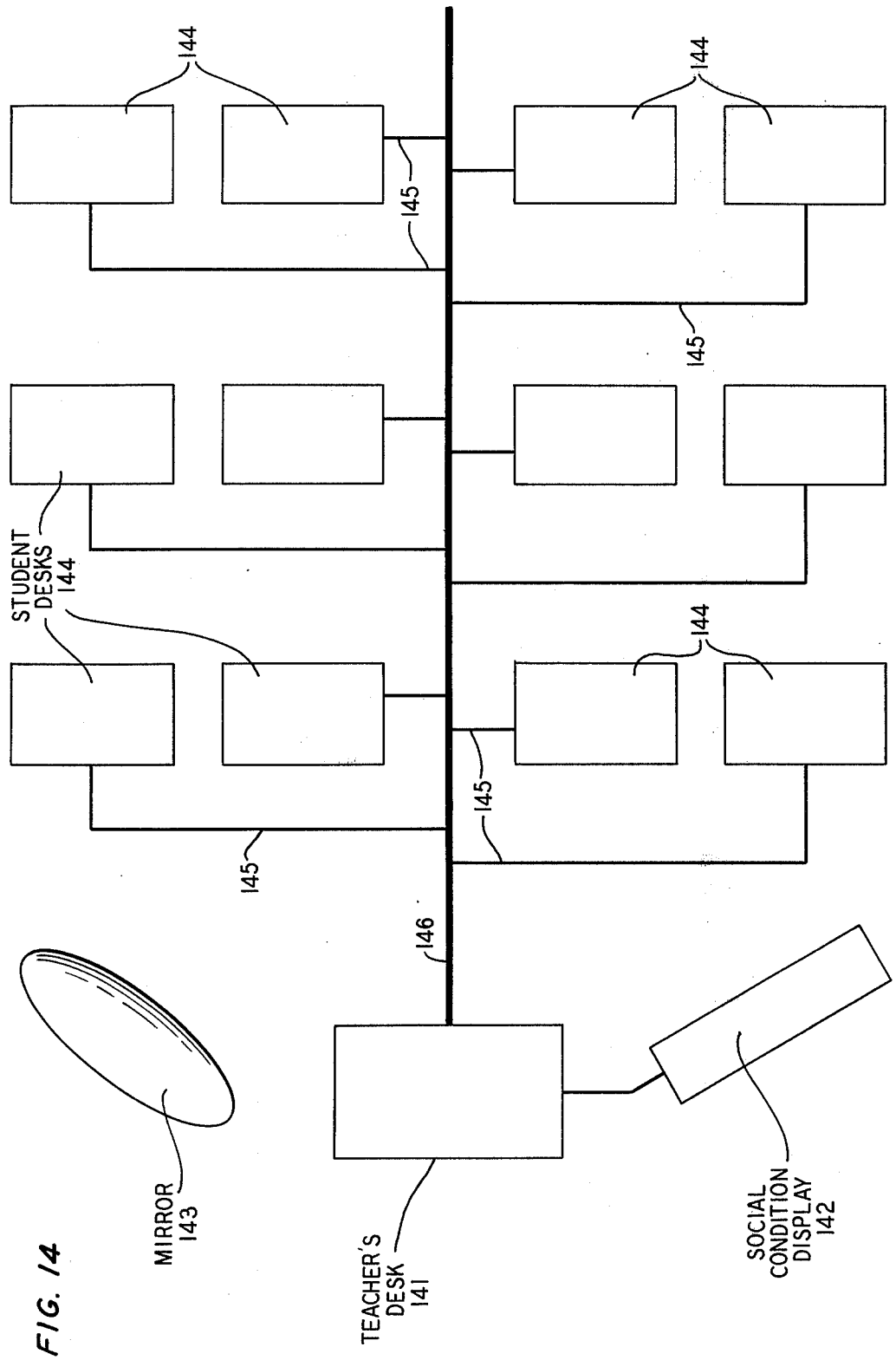

APPARATUS FOR SIMULATION OF INTERPERSONAL RELATIONSHIPS AND ACTIVITY

BACKGROUND OF THE INVENTION

The present invention relates to simulation apparatus. More particularly, the invention relates to apparatus for the simulation of decision making, behavior, and experiences of living beings such as human beings in interpersonal relationships and activity.

Communication and education concerning interpersonal relationships and activity in twos, small groups, a variety of organizational structures, and in social life at large has been and continues to be a subject of human endeavour. Such communication takes poetic, prose, and oral forms, among others. Scientific presentations and approaches have also appeared in this broad area. The Christian faith is concerned with redemption of each person in relationship (see, e.g. Matthew 18:1–20, I Corinthians 12, and Ephesians 6) and the Church calls this technological age to a vitality of interpersonal relationship commensurate with its sophistication in the engineering arts.

Even though living in interpersonal relationship is the day-to-day experience of almost every person, understanding our experiences and emotions is frustratingly elusive, difficult, paradoxical and subjective. And because it is so difficult for the individual to achieve such understanding, it is even more difficult to achieve a common social understanding of the most fundamental experiences and problems of life together. It is, therefore, a purpose of the invention to provide a kind of apparatus which can play a part in facilitating such individual and social understanding.

Oral communication regarding interpersonal relationships is important, although it is often difficult to focus attention on any one subject, especially if it be emotionally charged, so that significant new understandings may emerge. Written matter has the advantage of remaining changeless as the reader attempts to grasp its content, but the written word can be dry, difficult to grasp, ambiguous, and tediously complex in addressing fundamental questions in the area of interpersonal relationship. Moreover, it is difficult for many readers to think for themselves when pages of printed matter lie before them.

Diagrammatic approaches, such as sociograms and organization charts share the advantage with written matter of remaining changeless when read and have the further advantage of being more concise. However, such diagrams are essentially static representations which have limited usefulness in portraying dynamic psychological and sociological phenomena.

Role-playing simulations and experiments can be useful, but these can be time-consuming and difficult to organize. Computer simulations are similarly useful but can be time-consuming, expensive, and complicated.

Still another approach involves the use of a mechanical or electronic simulator of the individual person, the construction and operation of which closely relates to a simple analog of aspects of personality, emotions, outside influences, and behavior which are to be demonstrated. Such apparatus can be simple, largely self-explanatory, changeless when interpreted, and yet have a dynamic adjustable operation. A form of such a simulator is disclosed in my copending patent application, "Simulation Apparatus," Ser. No. 580,308 filed May 23, 1975, now U.S. Pat. No. 3,971,142 issued Jul. 27, 1976.

A simulator embodiment disclosed in said patent involves adjustment dials which are used to adjust positive and negative voltages corresponding to decisional influences the sum of which is applied to a level detector which operates decision-indicating lamps and display the decision which follows from the magnitude and type of decisional influences. Social pressure and leadership influence may be subjects of dial adjustment, as well as personal desire or inclination and certain personality variables.

However, it would be even more advantageous if such a simulator of the individual were constructed so that a plurality of simulators were capable of being brought into physical interrelationship analogous to interpersonal relationship. Then situations, paradoxes, and problems in interpersonal relationships would be greatly clarified and self-expressive and educational functions would be more readily accomplished. Just such a form of construction resulting in a variety of unusual simulation apparatus made possible thereby is accomplished according to an invention herein disclosed.

SUMMARY OF THE INVENTION

In accordance with the present invention, a simulator of the individual, or what may be called a psychological simulator, has one or more adjustment dials relating to decisional influences, a device for threshold detecting the decisional influences, and a decision indicator operable by the threshold detector, and additionally incorporates novel improvements over my said copending patent application No. 580,308, now U.S. Pat. No. 3,971,142. The novel improvements include the provision of a decision port for a physical output derived from the simulator corresponding to each decision indicated, and means for interrupting or substantially attenuating or turning off the physical output or its influence so that the effect of interpersonal relationship may be more effectively shown.

The term "decision port" as used herein is intended to be understood in a wide sense since the type of physical output can be electricity, light, sound, fluid force, or mechanical force, or other types of physical force, and since the manner of deriving the output can take different forms. For instance, the decision port can be an electrical terminal or a mere wire portion at which a bipolar voltage is made available—a positive voltage corresponding to one decision and a negative voltage corresponding to an alternative decision. The decision port can alternatively be a linkage for connection of a pushrod to which an analogous bilevel mechanical force derived from the simulator is transferred. The decision port can also be an optical or acoustic interface with the decision indicator itself.

The simulator article of manufacture just described finds its use with at least one additional simulator of the same type to which the physical output is brought and applied. The output may suitably be received at a "sense port" having reciprocal function relative to the decision port abovementioned. Two simulators linked in the manner described operate to provide a remarkable and convenient simulation of interpersonal relationships when the physical output produceable by the first simulator acts upon the second simulator as a physical influence analogous to a decisional influence. When the physical influence is turned off or on, the difference between what individuals would do in isolation and what they do in relationship is made clear. A simulation of two individuals is accomplished and the relationship of the activity of one to the activity of the other is demonstrated.

If both of two simulators are reciprocally connected so that a decision port of each one is linked to a sense port of the other in the manner just described, then a reciprocal interpersonal relationship such as the marriage relationship may be simulated.

More than two simulators may be connected in accordance with the invention so that small groups and organizations of various descriptions may be simulated and structured. A large group such as society itself may be simulated by directing all of the derived physical influences in common from many individual simulators so as to influence the decision indicated by each of the many simulators themselves.

Even more complex simulations involving the interrelationship of a plurality of large groups may be performed by interconnecting a plurality of large group simulators of the sort just described in a variety of ways all according to the present invention.

The invention can find application in psychology, social psychology, sociology, history, theology, the professions, the humanities, and other fields. Research, teaching, and learning of subject matter related to these areas is facilitated by its use. The invention may also be used as a means of self-expression and counselling in a clinical setting, and as a fascinating tool for self-education and for personal and emotional growth in other contexts.

The present invention will be more clearly understood by reference to the appended drawings and written description of some of the many particular embodiments thereof.

BRIEF DESCRIPTION OF THE DRAWINGS

FIG. 14 is a floor plan of a social studies simulation laboratory for practicing the present invention.

DETAILED DESCRIPTION OF THE DRAWINGS

Figure 1:
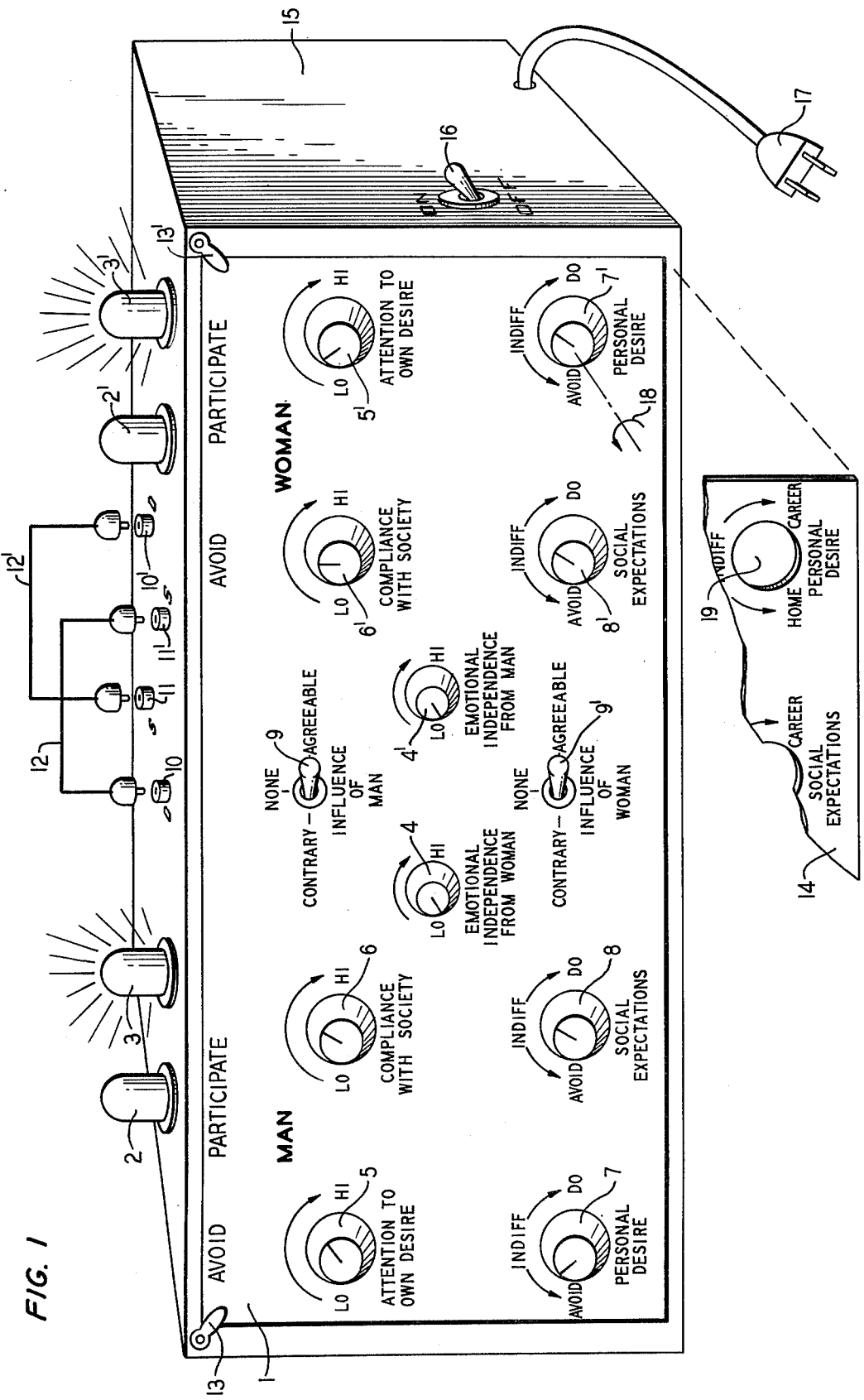
FIG. 1 is a perspective of the exterior of a simulator of man-woman relationships.

FIG. 1 shows the exterior of a simple form of the invention. A group of adjustable knobs 4,4', 5,5', 6,6',7,7',8, and 8' together with corresponding markings on panel 1 form adjustment dials which are used to set and indicate or enable indication of levels of various situational and personality factors acting as decisional influences which enter into the sexual relationship of a man and woman. The decision by each to avoid or participate in sexual intercourse is indicated by respective decision indicator display lamp assemblies 2,3,2', and 3', conveniently colored red and blue alternately in order from left to right. For instance, if the man avoids intercourse, decision indicator lamp assembly 2 is illuminated and if the woman avoids, the corresponding lamp assembly 2' is illuminated. If the man participates in intercourse or decides to do so, indicator lamp assembly 3 is illuminated and lamp assembly 2 is dark. Similarly, if the woman participates in intercourse or decides to do so, lamp assembly 3' is illuminated and lamp assembly 2' is dark.

Closer examination of the simulation apparatus shows at knob 7 that the personal desire of the man is moderately strong to avoid intercourse. Knob 5 is set to indicate a rather high degree of attention to own desire, or impulsiveness, by the man, so that his personal desire will have considerable weight. Knob 8 indicates that the social expectation is moderate that the man do participate, a situational factor which usually occurs in the marriage relationship. This man is rather high in compliance with society as indicated by knob 6, so the social expectation will be given significant attention in his decisionmaking.

The woman portrayed in simulation has a moderately large personal desire to participate in intercourse as indicated by knob 7', but she is characterized by a low degree of attention to her own desire in this respect; that is, she is given to disregard her own desire for intercourse. Knob 8' is set to indicate that because she is hypothetically married to the man there is a social expectation that she participate. Her compliance with society's expectation is moderate as indicated by knob 6', which means that social expectations will be given moderate attention in her decision to avoid or participate.

Without more, the simulator decision indicators 2,2',3, and 3' would indicate that the man would avoid intercourse, albeit ambivalently, and that the woman would want it and try to bring it about, i.e. lamp assembly 2 (Man-Avoid) and lamp assembly 3' (Woman-Participate) would be illuminated. This condition is seen when switch handles 9 and 9' (Influence of Man; Influence of Woman, respectively) are set to "None." The "None" setting of switch handle 9 turns off or interrupts any physical influence of the man-simulator on the woman-simulator, and switch handle 9' operates conversely to turn off influence by the woman on the man in simulation. Setting knobs 4 and 4' to High Emotional Independence settings would essentially turn off physical influence as well, by attenuating transmission of physical output, but since emotional independence is a constant of a relationship in the short run, it is preferable to include the switches in the simulator as well.

However, these two partners are in personal relationship with one another, and this influences their behavior.

In this personal relationship the decisions of the man influence the woman and vice-versa. Correspondingly the apparatus of the simulator is arranged to produce output voltages corresponding to the decisions of the man and the woman which are made available at decision port terminals 10 and 10' respectively. When conductors 12 and 12' are connected to terminals 10, 11', and 10', 11 as shown, these voltages are conducted or communicated from terminal 10 (Man-Decision) to terminal 11' (Woman-Sense) and from terminal 10' (Woman-Decision) to terminal 11 (Man-Sense) respectively. The terminals 11' and 11 marked "Sense" act as sense ports and are connected to electronic circuits (discussed in detail in connection with FIG. 2) so that the decision voltage from each individual person-simulator has influence on the decision indication of the other.

Switch handles 9 and 9' select the nature of the influence of each upon the other: "Agreeable" in that a decision of one tends to produce a similar decision by the other; "None" in that the influence is nonexistent or that the subject of conversation has not been brought up; and "Contrary" in that a decision of one tends to produce a contrary decision on the part of the other. The degree of the influence of the type selected is adjustable in simulation by the reciprocal "Emotional Independence" adjustment dials including knobs 4 and 4' shown in FIG. 1 near the center of panel 1.

Returning to the hypothetical marital relationship shown in simulation by the apparatus having the adjustment dials set as shown, it is seen that both partners have an "agreeable" influence on the other in sexual matters as indicated by the switch handle 9,9' settings. That is, each tends to do what the other wants to do. Also, the man and woman portrayed have extremely low emotional independence from each other so that the decision of one has a strong influence on the decision of the other.

Given this state of affairs both partners are under pressure to do what the other wants to do. It is difficult to predict by deduction what will happen, but the simulator when constructed and operated can show in this situation that the woman, even though she is rather "selfless" in such matters can fulfill her desire to participate in spite of the man's personal desire to avoid, as shown by the indication on lamps 3 and 3' that both decide to participate. This can be explained by considering the time sequence in which influence occurs, the time sequence being related to the flow of conversation or activity. If "influence" switch handles 9 and 9' are both set to "None," the woman decides to participate and the man decides to avoid. If the woman speaks or indicates her decision before the man, simulated by setting or turning on "Influence of Woman" switch handle 9' to "Agreeable", then her influence due to the man's love for her causes the man to participate despite his desire not to. His decision to participate confirms the woman's influence when "Influence of Man" switch handle 9 is also set or restored to "Agreeable." However, if the order of communication is reversed in simulation by reversing the order of setting the switch handles, it turns out that both partners avoid. Thus, in spite of the fact that unpredictable and even seemingly paradoxical situations can and do occur in the real-life man-woman relationship, the apparatus of the invention can provide a substantially faithful simulation of them.

The marital example can be carried another step. Suppose that the man in participating in spite of his personal desire to avoid is clumsy and unsatisfactory to the woman. Her personal desire to participate evaporates and she begins to desire to avoid further participation, as indicated by a counterclockwise manual rotation of "Personal Desire" knob 7' to "Avoid," as indicated by arrow 18.

The simulator decision indicator lamps 3 and 3' continue to be illuminated, indicating that the man and woman continue to participate in spite of the fact that both parties personally desire to avoid. Were it not for the fact of relationship both partners would indeed decide to avoid, as seen when switch handles 9 and 9' are set to "None" so as to turn off physical influence. Thus, a paradoxical "vicious circle" of both partners doing what each would avoid is faithfully simulated by the apparatus of the invention.

Experimenting with the adjustment dials in light of one's own experience will reveal other simulations of man-woman relationships ranging in character from healthy to demonic. If a switch handle 9 or 9' be switched to "Contrary," then relationships can be simulated in which disagreements are common. The "Contrary" switch setting reverses the decision voltage polarity at a decision port, so that a decision by one partner produces a contrary decision influence upon the other.

In view of the fact that the simulations provided by the invention can relate to highly personal matters, the apparatus is suitably checked for proper operation prior to use by setting switch handles 9 and 9' to "None," all other nobs to the 12 o'clock position and "rocking" knobs 7,8,8', and 7' in turn. Clockwise rotation will make the corresponding rightward lamp 3 or 3' go on and counterclockwise rotation lights the corresponding leftward lamp 2 or 2'. It is found that some persons must acquire a confidence that the apparatus indeed provides an accurate simulation. In general, the adjustment dials, switches, and decision indications must be accurately read and understood for maximum utility, and the invention should always be used in a constructive and reputable manner.

The knob and switch handle settings may be given a variety of interpretations to fit different situations by changing the panel markings. This may be conveniently accomplished by fastening different overlay sheets 14, which can be spiral bound, beneath fasteners 13 and 13'. Holes 19 in such a sheet 14 provide clearance for the knobs. In FIG. 1 the cutaway portion of sheet 14 suggests a simulation of a husband and wife considering whether the wife should be a housewife or pursue a career. The entire simulation apparatus is conveniently housed in a cabinet 15 upon which is mounted an "On-Off" power switch 16 for interrupting power derived from commercial mains to which plug 17 is connected. Separate cabinets and power sources for each individual simulator portion can, of course, be used. The adjustment dials need not be continuously adjustable, since adjustment dials having detentes or successive switching over a range of decisional influence levels can be suitable for practicing the invention as well.

Figure 2:
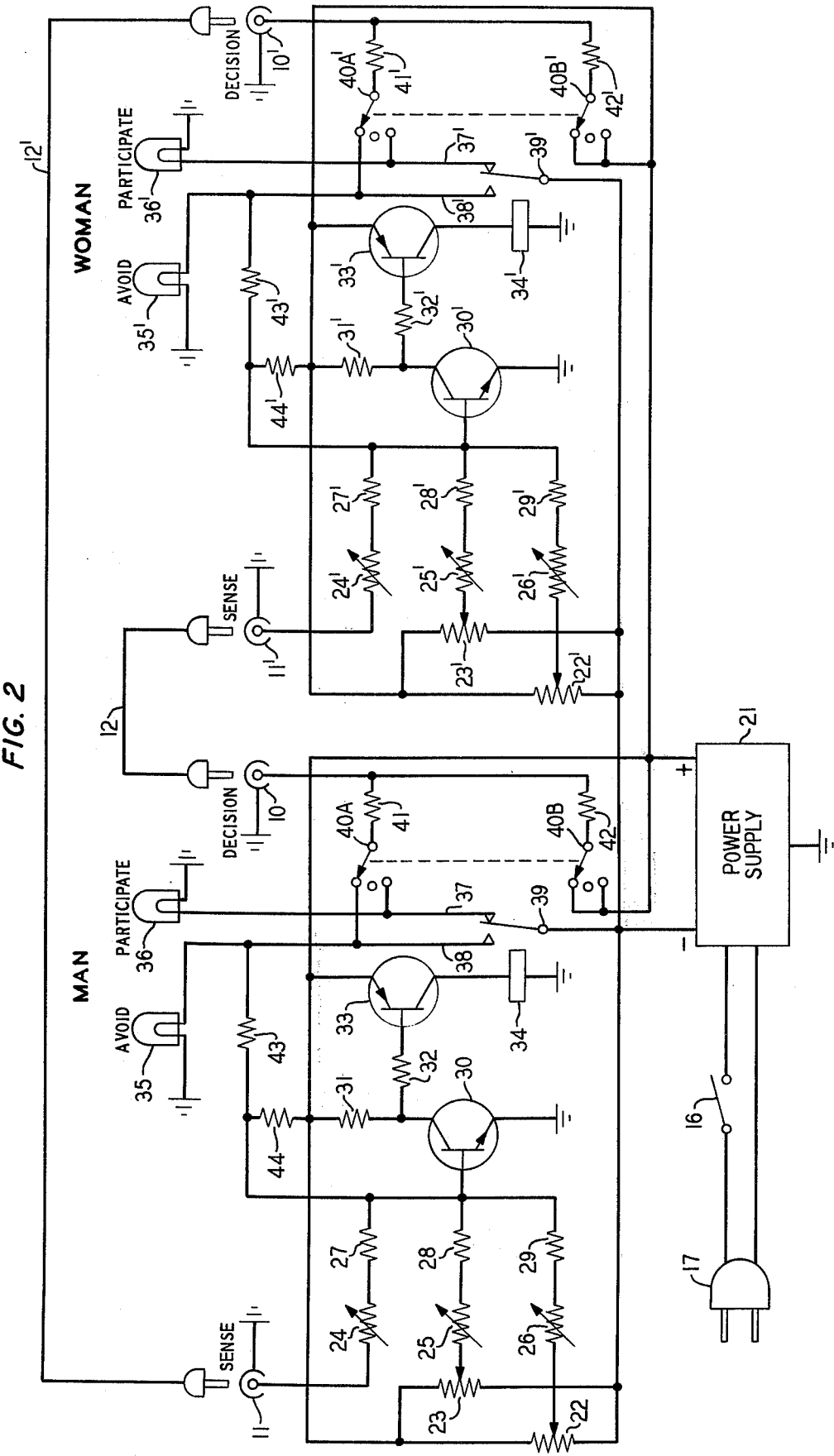
FIG. 2 is a schematic diagram of an electrical circuit which may be used in the simulator of FIG. 1.

FIG. 2 shows the schematic diagram of an electronic circuit suitable for use in the simulation apparatus of FIG. 1. Plug 17 and switch 16 bring power to a dual-polarity power supply 21, which is connected to two identical electronic circuits for individual simulators of the man and the woman. Corresponding components of each simulator are given the same number except that all numbers are primed in the woman-simulator circuit. A description of the circuit of the man-simulator follows, it being understood that a reciprocal description applies to the woman-simulator circuit.

Potentiometers 22 and 23 of suitably identical resistance are connected across the dual polarity power supply 21 and provide a wiper voltage having a value between the positive and negative power supply voltages with respect to ground. Potentiometers 22 and 23 are attached to knobs 7 and 8 of FIG. 1 (Personal Desire; Social Expectations) respectively so that essentially zero wiper voltage corresponds to a knob setting of "Indiff." (Indifference), negative wiper voltage corresponds to "Avoid," and positive wiper voltage corresponds to "Do." The wipers of potentiometers 22 and 23 are respectively connected to variable resistors 26 and 25 having resistances suitably greater than the potentiometers. Variable resistors or attenuators 26 and 25 are respectively attached to knobs 5 and 6 (Attention to Own Desire; Compliance with Society) and the electrical connections are made so that the LO knob settings correspond to the high resistance settings of the variable resistors 26 and 25.

Sense port terminal 11 admits an electrical or other physical force and is connected to one end of variable resistor or attenuator 24 which is attached to knob 4 (Emotional Independence) and wired so that low Emotional Independence corresponds to the low resistance setting. Variable resistors 24, 25, and 26 are suitably equal in resistance and in turn are all connected to the base or input of threshold detecting transistor 30 via short circuit current limiting resistors 27, 28, and 29 respectively, having resistances suitably being equal and designed to be a fraction of the maximum resistance of any of the variable resistors.

If the base or input voltage of NPN transistor 30 exceeds an approximately zero voltage threshold, transistor 30 conducts electric current from the power supply through collector resistor 31 to ground through its emitter. In this manner an electrical force at sense port 11 as well as from the potentiometers is able to cause an influence on the operation of the circuit in analogy with a decisional influence on an individual. PNP amplifier transistor 33 having its emitter connected to the positive power supply voltage senses the collector voltage of NPN transistor 30 through series resistor 32 connected to its base and responds so that when transistor 30 conducts, transistor 33 conducts an amplified current from its collector through relay coil 34 to ground. When coil 34 is energized, relay armature 39 allows negative power supply voltage to be conducted to relay contact 37 to cause to light the "Participate" lamp 36 located in decision indicator display lamp assembly 3 of FIG. 1. This corresponds to a net decisional influence to participate exceeding the threshold, as indicated on the adjustment dials 5,6,7,8, including any decision voltage influence produced by the other psychological simulator circuit on sense port 11. When coil 34 is not energized, negative power supply voltage alternatively passes to relay contact 38 to light the "Avoid" lamp 35, located in decision indicator lamp assembly 2 of FIG. 1. In this manner the functions required to implement the adjustment dials and light-emitting decision indicators visible on the exterior are provided by electronic device means.

In an experimental version of the invention the following specific values were used: Positive supply voltage as +9 volts; negative supply voltage was −6 volts; R22=R23=10,000 ohms (10K) linear taper; R24=R25=R26=100,000 ohms (100K) linear taper; R27=R28=R29=47,000 ohms (47K); R31=22,000 ohms (22K); R32=1000 ohms (1K); R42=3,000 ohms (3K); R41=1000 ohms (1K); Relay 34 was 6v, 12 milli-amperes, 500 ohms; transistors 30 and 33 were medium beta between 30 and 100. A reverse current protecting diode of 1N34 type was connected between transistor 30 base and ground so as to conduct with negative voltage present at transistor 30 base. Transistor 30 conducts when the base voltage is somewhat greater than zero, but this does not present any problem in the given circuit. If desired, relay chatter is eliminated by connecting a 10 microfarad capacitor across each relay.

Decision voltage terminal 10 is connected so that a physical decision voltage or force output may be derived from the individual, or psychological, simulator circuitry and made available thereat. When switch handle 9 of double-pole-triple-throw polarity reversing switch 40, including segments 40A and 40B, is set to "Influence of Man--None," terminal 10 floats electrically and the decision force is interrupted so that physical output is turned off.

When the switch handle 9 is set to "Agreeable," then terminal 10, which is connected to the junction of resistors 41 and 42 which are in turn respectively connected to the switch rotors of segments 40A and 40B, bears a voltage of the same polarity as the polarity of the voltage relative to threshold voltage found at the base of threshold detector transistor 30. This accomplished by selecting resistors 41 and 42 to have values such that the positive power supply voltage applied to resistor 42 combines with a negative or zero voltage (applied to resistor 41 via relay contact 38 or continuity through incandescent light bulb 35 respectively) to produce corresponding negative and positive alternative decision voltages, preferably equal in magnitude, depending on the decisions being simultaneously indicated by the lamp assemblies 2 and 3.

Then when transistor 30 conducts with switch 40 set to "Agreeable," a positive voltage appears at decision port terminal 10; and when transistor 30 is not conducting, a negative voltage appears at decision port terminal 10. When switch 40 is set to "Contrary," the decision voltage at terminal 10 is reversed in polarity, e.g. negative terminal 10 voltage occurs with transistor 30 conducting.

To further clarify the nature of the decision voltage, let it be pointed out that a voltage like the "Agreeable" voltage may be generated by optional resistors 43 and 44 (suitably having values R43=100,000 ohms (100K); R44=300,000 ohms (300K) connected to relay contact 38 and positive power supply voltage respectively and preferably having the same resistance ratio as resistors 41 and 42 respectively, the junction of resistors 43 and 44 being connected to the base of transistor 30. In this manner an "Agreeable" electrical influence voltage is fed to transistor 30 base. This voltage will tend to hold transistor 30 in whatever state it has unless the current from the other sources is sufficient to make transistor 30 change state. In this manner a certain amount of "stubborness" or "set in one's ways" or "conservatism" is introduced into the decisions indicated by the individual simulator, since shifting decisional influences will be less likely to bring about changes in decisions indicated. Comparing this operation with the action of the decision voltage at terminal 10, the "Agreeable" decision voltage at terminal 10 acts to tend to bring about agreeing decision indications when applied to a *separate* individual simulator, the woman-simulator, and the "Contrary" influence voltage tends to bring about contrary decision indications when so applied.

Then when conductors 12 and 12' are connected as shown in FIGS. 1 and 2 to communicate, or allow transmission of physical output, between the man and woman psychological simulator circuits, the electrical interaction between the two circuits is analogous to the interpersonal or interactive relationship indicated in simulation on the adjustment dials, switches, and decision indictor lamp assemblies of FIG. 1.

Figure 3:
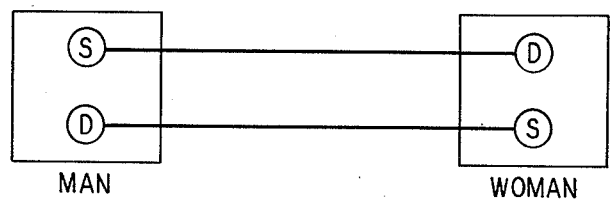
FIG. 3 is a block diagram of the simulator of FIG. 1, showing it being composed of two individual psychological simulators.

FIG. 3 is a block diagram for introducing a simplified mode of representation which is useful in disclosing more complex embodiments of the present invention. The block diagram represents the man-woman relationship simulator of FIG. 1 and FIG. 2, or an equivalent according to the invention. FIG. 3 shows the man-woman simulator being composed of two blocks or units—a man-simulator block and a woman-simulator block. A physical influence corresponding to a decision indicated by each individual simulator (D) is coupled to the other in a man such that it acts as a decisional influence which is sensed by the other simulator at the sense port (S).

Figure 4:
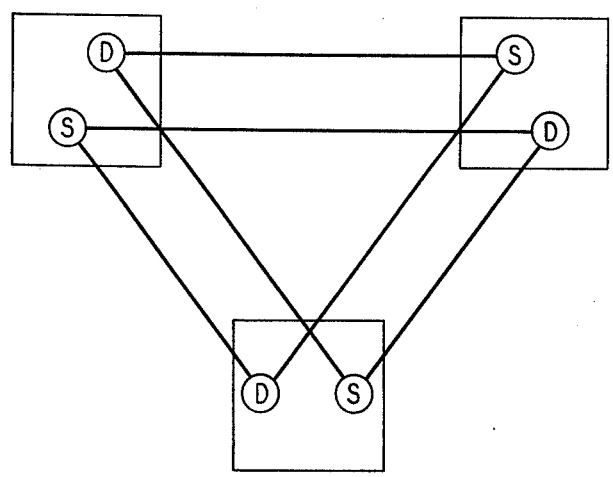
FIG. 4 is a block diagram of a small group simulator composed of three individual simulators housed together as in FIG. 1 or separately.

Keeping in mind the block diagram symbols of FIG. 3 it is seen that FIG. 4 illustrates a form of the invention in which three individuals are simulated in a relationship such that the decisions of each are sensed by every other. Each individual simulator unit suitably has circuitry like that of one of the two simulators of FIG. 2 and may be housed with the others in a manner similar to FIG. 1 or separately.

The SMALL GROUP shown in simulation can be a business partnership, for example, and the decision simulated can be a decision whether or not to liquidate the business. Decisional influence adjustment dials may suitably be provided to indicate levels of personal inclination, social expectations, and creditor pressure in addition. Emotional Independence dials and Influence switches as shown in FIG. 1 are also useful.

The interconnection scheme of FIG. 4 in which each decision terminal is connected to each sense terminal of all the others may be extended to any number of such simulators, of course, so that groups having this relationship structure may be simulated. Interconnection is accomplished by conductive wires if an electronic system is used, or by the analog of a conductor in non-electrical systems. A convenient degree of isolation can be provided by employing resistive pathways, or their equivalents, instead of wires alone, however.

Figure 5:
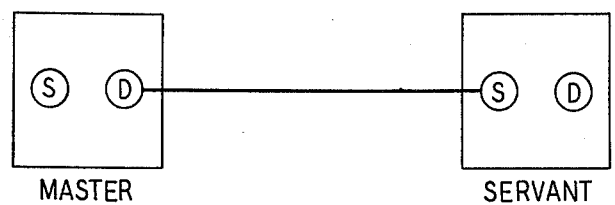
FIG. 5 is a block diagram of two individual simulators connected to simulate a master-servant relationship.

A connection scheme for simulating a "one-way" relationship is illustrated in FIG. 5. One simulator involves decisionmaking by a MASTER and the other involves decisionmaking by a SERVANT. The decision port (D) of the master is connected to the sense port (S) of the servant. In this manner the decision of the master has an influence on that of the servant but not vice-versa. The simulator panels corresponding to panel 1 of FIG. 1 can be marked so that the decision of the master is whether or not to insist on the peformance of an unpleasant chore. At least one decisional influence adjustment dial is provided on each simulator to indicate personal inclination.

Figure 6:
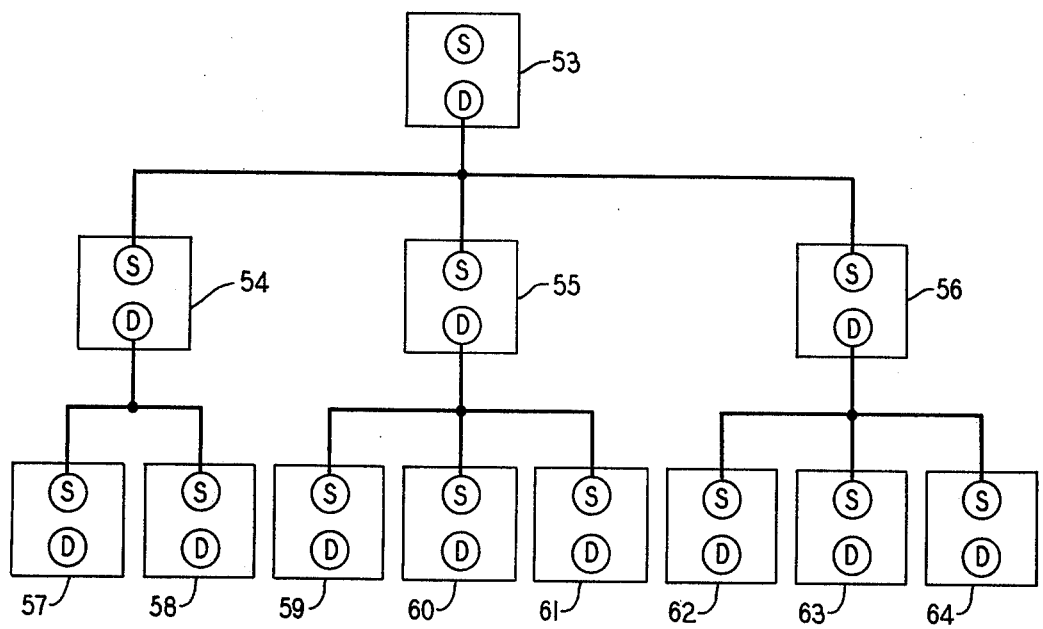
FIG. 6 is a block diagram of a hierarchy simulator composed of hierarchically connected individual simulators.

FIG. 6 shows how a chain of one-way relationships is simulated. In analogy to hierarchical organization, each simulator unit representing a subordinate has a sense port connected to the decision port of a simulator representing a superior. Simulator 53 represents, for instance, a manager who decides whether or not to direct supervisors 54, 55, and 56 to reprimand subordinates who report late for work. The supervisors, who may personally desire to avoid such responsibility, in turn must decide whether or not to undertake this unpleasant business duty, and the employees 57 through 64 must decide whether or not to report on time for work. Various decisional influences, including personal desire, are indicated on adjustment dials of each simulated person in accordance with the principles previously described in connection with individual simulator units. The physical decision output of a simulator of a superior is seen to be able to influence a plurality of subordinates in analogy with a decisional influence on each. In turn the supervisors, who are also subordinates, are simulated so that physical decision outputs influencing the next lower level of subordinates are available as well. Switches are suitably provided at least on simulator units 53, 54, 55, and 56 for turning the decision outputs on and off so as to show the effect of the organizational relationships.

Figure 7:
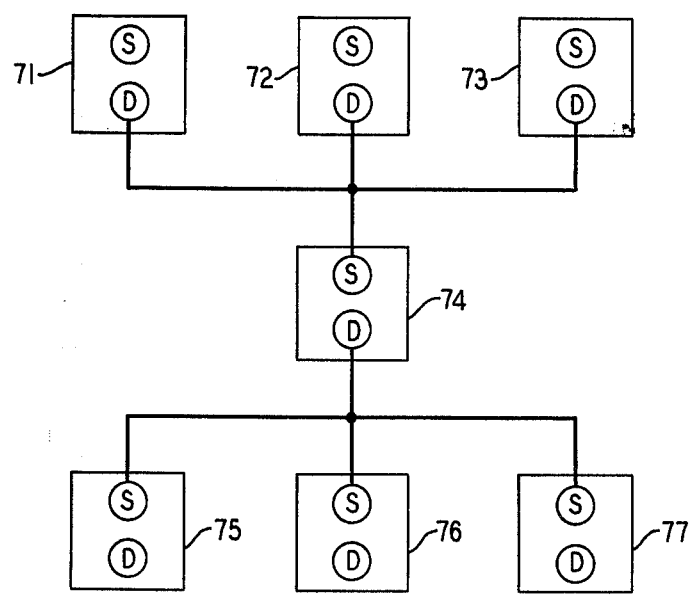
FIG. 7 is a block diagram of a collective leadership simulator composed of individual simulator units.

FIG. 7 shows a block diagram of a group of individual simulator units connected together to simulate a portion of a hierarchy having collective leadership at the top level. For example, consider a corporation having a three-person Board of Directors, a President, and three Executive Vice-Presidents, where the decision at hand is adoption or not of an Affirmative Action policy with respect to promotion of employees who have previously been discriminated against. Each person (Simulators 71, 72, and 73) on the Board of Directors is influenced on this question by personal inclination, government incentives, and social pressure--adjustment dials being provided to correspond and decision indicators being marked to indicate the same decision alternatives. The vote of the Board of Directors on this question is a collective influence which is transmitted to the President (Simulator 74), and through the President to the Executive Vice-Presidents (Simulators 75, 76, and 77).

When a vote of the Board of Directors is simulated by connecting the decision ports of individual simulators suitably having electronic circuits as in FIG. 2, a vote voltage output is generated or derived proportional to the arithmetical average of the decision outputs of each of the individual simulators of the Directors. This effect is obtained when the Thevenin equivalent resistances $R41R42/(R41+R42)$ at each decision port terminal of each simulator are equal. However, analogous arrangements according to the invention may readily be devised in nonelectronic apparatus as well.

For example, suppose that the alternative open circuit decision voltages produced by each of the individual simulators 71, 72, and 73 are +3 volts for "Yes" and −3 volts for "No." Then if all the simulated Directors vote "Yes," the collective output will be about equal to the open circuit decision voltage of each one (+3 volts); if all vote "No," the collective output voltage will be about −3 volts. If a majority (2) vote "Yes," the voltage will be of same sign as the unanimous "Yes" voltage but smaller in magnitude (+1 volt); and if a majority of 2 vote "NO" the voltage will be of the same sign as the unanimous "No" voltage but smaller in magnitude (−1 volt). Thus, if at least a majority of the simulated Directors vote "Yes" to Affirmative Action, the collective voltage influences the President simulator 74 to implement the policy of the Board. Thus, the physical decisional output influence of the Board simulator units on the President simulator unit is caused by contributions due to the physical output of each Board simulator unit. An abstaining vote is simulated by setting a turnoff switch handle like 9 of FIG. 1 on a Board simulator unit to "None." The President simulator and Executive Vice-President simulators are constructed so as to operate according to the teachings and principles set forth in connection with FIG. 6. Nonelectronic versions of the simulator of FIG. 7 may of course be fashioned.

The individual simulators of the invention shown in block form lend themselves to a wide variety of connection arrangements. The invention as a whole is suited for use as an "electronic organization chart" having unusual flexibility, versatility, and dynamic operation.

Figure 8:
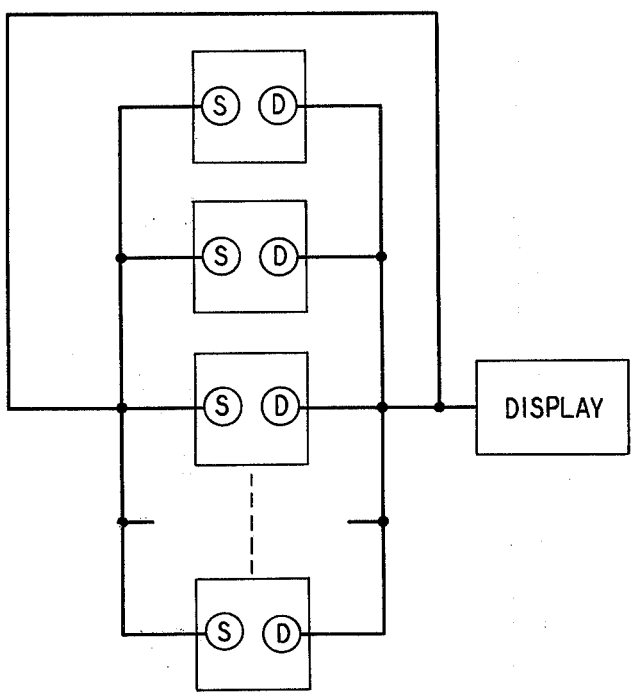
FIG. 8 is a block diagram of a social group simulator composed of individual simulator units.

A social group simulator according to the present invention is shown in FIG. 8. The actions of people in social groupings are simulated such that each individual contributes to "what society says," albeit in only a small way when large numbers of individuals are involved, and "what society says" is sensed in turn by each individual. The electrical interconnection arrangement corresponding to this form of social interrelationship involves a common connection of all of the decision ports of the individual simulator units so that the arithmetical average of the individual decisions is formed. Consequently, the "voice" of each simulator in "what society says" as measured on a DISPLAY galvanometer is inversely proportional to the number of persons in the group simulated. The common output voltage is fed back to every sense port in the group of individual simulators so that "what society says" is sensed by every simulated individual. No adjustment dials 8 and 8' for "Social Expectations" as used in FIG. 1 are necessary since the social expectations are generated by the simulators as a social group themselves.

For example, let the simulated social decision be whether or not one believes that men should wear beards in public. Each simulator is equipped with at least one decisional influence adjustment dial such as one relating to "Personal Inclination." The collective decision output is registered on a social condition DISPLAY such as galvanometer, which may be marked to indicate absolute numbers of simulators deciding for beards, percentage support for beards, or qualitative support ("everybody opposes," "everybody thinks so," "most think it's all right"). This form of the invention can be used to demonstrate phenomena such as tendency to preserve the social status quo even when a majority of people disagree in personal inclination with "what society says." Thus, the invention provides an illustration of the sociological principle often stated as "the whole is more than the sum of its parts." However, a rapid historical transition to an opposite collective opinion occurs when enough people finally desire the transition strongly enough. It should be understood that even though society is composed of millions of people, it is rarely necessary to provide one simulator unit corresponding to each person. For most purposes a few dozen simulators or less will suffice.

Figure 9:
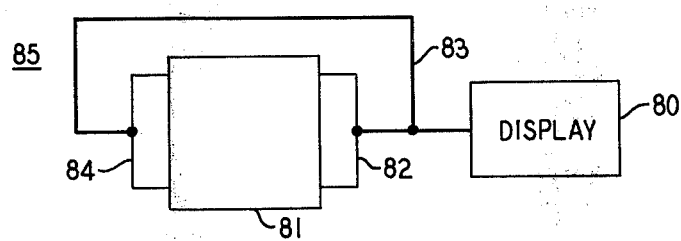
FIG. 9 is a simplified block diagram of a social group simulator identical in construction with that illustrated in FIG. 8.

To describe even more complex forms of my invention the simplified block diagram in FIG. 9 of the social group simulator of FIG. 8 is employed. All of the simulators of FIG. 8 are called a "collection," which is diagrammed as a rectangle 81 in FIG. 9. The decision ports in common connection in FIG. 8 are called collectively a "fanout," which is shown in the form of a right bracket 82, and the sense ports in common connection are called a "fanin," which is shown as a left bracket 84 in FIG. 9. Fanin 84, collection 81, and fanout 82 constitute a "body" 85. The collective decisional output, or social output, on fanout 82 is demonstrated on display means 80. The physical interconnection of all leads of fanout 82 to all leads of fanin 84 is made by means of a common "feedback path" consisting illustratively of a conductor wire 83. (All individual simulators are assumed to be internally configured as if they have Influence switches like switch 40 with handle 9 of FIG. 1 set to "Agreeable.")

Figure 10:
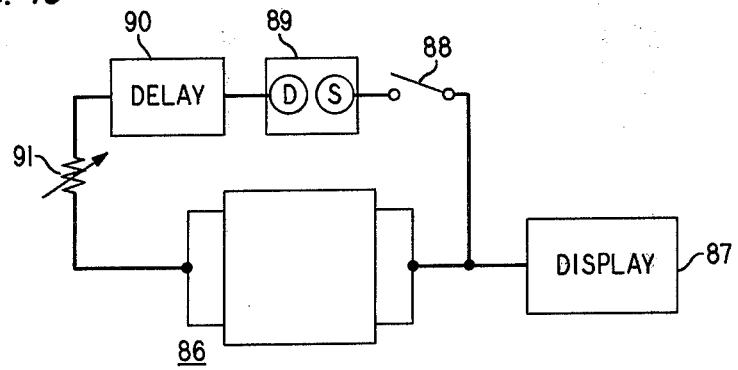
FIG. 10 is a simplified block diagram of a social group simulator showing certain optional elements included in a feedback path.

FIG. 10 shows how additional elements may be provided in the feedback path of a social group simulator to even more fully utilize its simulation potential.

Switch 88 is interposed in the feedback path in order to turn off the physical output, or social influence, from every individual simulator when electrically open. In this way the physical decision outputs are prevented from communication along the feedback path to the sense ports. When switch 88 is closed, the influence of society executes a history which is suitably observed on DISPLAY 87.

The application of variable resistance 91 is clarified by first noting that the individual simulators in the body 86 have input resistances from their respective sense ports to ground. The input resistances may be adjusted or hardwired to conform to an appropriate verisimilar statistical distribution, such as a Gaussian (bell-shaped) distribution, bimodal distribution, and so on. Collectively, as body 86, the individual simulators have an average input resistance which is related to the degree to which the social group is isolated from, or to the degree to which it is conscious of, itself. Each individual simulator input resistance can be changed to cause the average to vary, but the average is also conveniently varied by the insertion of the variable resistance 91, or equivalent means for attenuating the physical social output of whatever physical character along the feedback path. Then the average decisional isolation from the social condition is adjusted and indicated by an adjustment dial attached to variable resistance 91 not unlike the Emotional Independence adjustment dial 4 of FIG. 1.

Since it takes time before an actual social decision becomes known to the members of the social group, DELAY device 90 is suitably provided in the feedback path for simulation of this fact. For example, in the beard-decision hypothetical social situation described above, a certain length of time is required for individuals to grow a beard and for each to observe others and make a decision based on what is happening. By means of a physical delay in the simulation apparatus, an historical transition to a new social state is observed in slow motion as a "snowballing" of individual decisions.

Of course, delay devices can be placed at each individual decision port or sense port to provide suitable simulation in place of or in addition to DELAY device 90. The form of delay device provided may be any one of a number of such devices familiar to the art, examples being an acoustic delay line or helix when the physical output is sound, and a capacitor tied from the feedback path to ground when the physical output is electricity. Delays of several seconds can be advantageously introduced for simulations in a classroom context.

An individual simulator unit 89 is provided in the feedback path for simulations in such areas as political science and mass media communication analysis. The sense port of individual simulator 89 is connected to the decision port side of the feedback path, that is, so as to intercept the physical output available from the fanout of body 86. The decision port of individual simulator 89 is connected to the other side, or sense port side, of the feedback path, either to the fanin directly or to an optional component such as DELAY device 90. Individual simulator 89 can represent editorial decisionmaking in a newspaper serving the social group. The newspaper may play up or play down in nonlinear processed manner the social condition indicated at DISPLAY 87 with a consequent influence on the social group.

Figure 11:
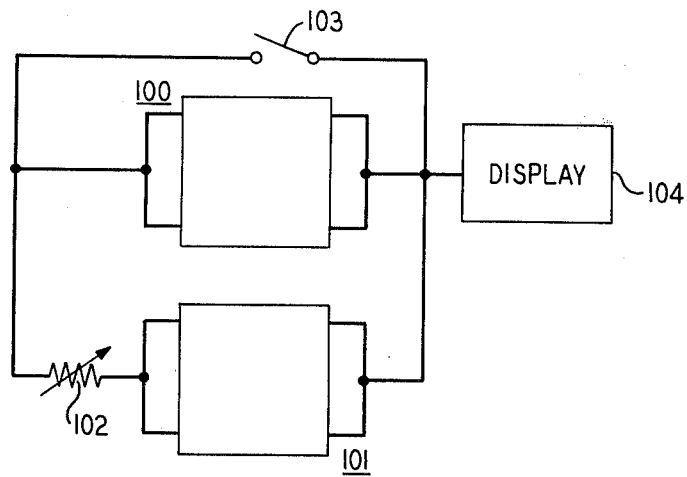
FIG. 11 is a simplified block diagram of a social interrelationship simulator composed of two social group simulator blocks one of which is more isolated than the other.

Social groups having subgroups or subcultures may also be simulated according to the present invention. For instance, FIG. 11 represents a social group of youths including urban subgroup body 100 and rural subgroup body 101. The feedback path, which includes switch 103, is bifurcated into a direct line to the fanin of body 100 and a variable resistance or attenuator 102 to the fanin of body 101. The history executed by the social group of youths and indicated on DISPLAY device 104 will be such that the urban youth subgroup is more responsive to social change than the rural subgroup. Arrangements may also be fashioned so that each subgroup has a display device.

Figure 12:
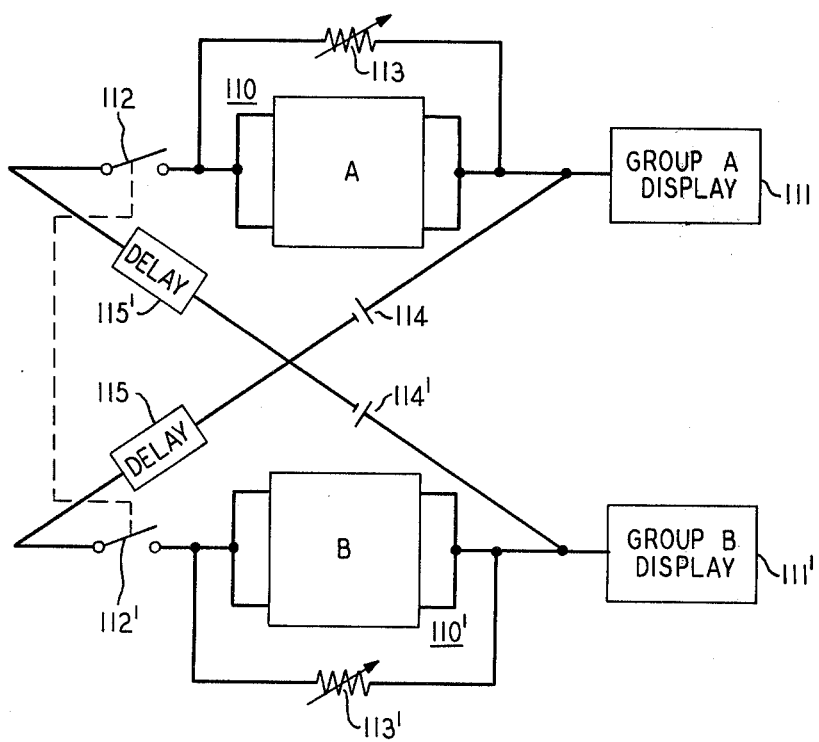
FIG. 12 is a simplified block diagram of another type of social interrelationship simulator including two social group simulator blocks connected to simulate a polarized society.

FIG. 12 shows another simulation configuration relating to groups, which is of interest particularly in the study of race, ethnic, religious or other group conflict. Each group is in the feedback path of the other. A history of group conflict is executed by the simulation configuration, and it can be used to show how such conflict tends to perpetuate itself and can be sparked by single individuals.

Each individual simulator in group body 110 is, for example, arranged to simulate decisionmaking by a white person to act hostile to black people or not; and each individual simulator in group body 110' is arranged to simulate decisionmaking by a black person to act hostile to white people or not. Feedback variable resistors 113 and 113' are adjusted to values reflecting each group's awareness of itself, and initializing switches may also be placed in the feedback paths for each individual group with the variable resistors. Display devices 111 and 111' indicate the collective decisionmaking of each group. Two feedback crossloops connect and provide communication for the fanout of body 110 to the fanin of body 110' and the fanout of body 110' to the fanin of body 110 respectively.

In situations of group conflict it is commonly observed that violent acts of only a mere few in one group catch the attention of the opposing group, and peaceful behavior goes relatively unnoticed. This circumstance is taken into account by inserting bias batteries 114 and 114', (preferably having a value equal to the negative of the positive decision voltage from a body corresponding to unanimous peaceful behavior) in the feedback paths between the group bodies so that only a nonpositive voltage can appear at the fanin of each group due to the influence of the decision output voltage of the other group body. A bias can alternatively be produced by fabricating a second fanout of resistors, one resistor per individual simulator, from each contact 38 (see FIG. 2) and connecting the second fanout so formed to the feedback crossloop, the bias battery being omitted. Communication delays are accounted for by insertion of time delay blocks 115 and 115'.

To illustrate a simulation process let identical Gaussian distributions of sense port input resistance be set up for bodies 110 and 110'. Personal desire adjustment dials are marked and attached to potentiometers like 22 in FIG. 2 so that negative wiper voltage represents hostility and positive wiper voltage represents peaceful intentions. A second fanout of resistors from contact 38 of each individual simulator in each group body is employed as described above, so that zero voltage represents peaceful behavior and negative voltage output represents hostile behavior. The personal desire dials are set hypothetically so that all but 5% of the individuals simulated in body 110 and all in 110' have peaceful intentions toward the other group as a matter of abstract principle.

Ganged switches 112 and 112' close the feedback crossloops and allow an historical sequence of events to commence as shown on displays 111 and 111'. At first only 5% of body 110 and none of body 110' show hostility. But the 5% of hostile individuals in body 110 engender hostility in body 110' by impressing negative voltage thereon, causing a small percentage as shown on display 111' to react with hostility. The hostile reaction, though small, in body 110' is fed to body 110 which reacts with more hostility, which in turn sets off still more hostility in body 110' due to the Gaussian input resistance distributions. The cycle of negative crossloop influence continues as an upward spiral of hostility as indicated by rising violent decisions on both displays until a polarized steady state of constant conflict is reached. Due to the crossloop and group feedback (113 and 113') influences, the steady state hostility becomes entrenched in the intergroup relationship (even though desired by only 5% of one group and none of the other) until dissipated by historical intervention, attrition, or other processes, not simulated in FIG. 12. Ganged switches 112 and 112' may be opened to turn off communication along the crossloops and re-closed to allow repetitive observation of the sequence.

Figure 13:
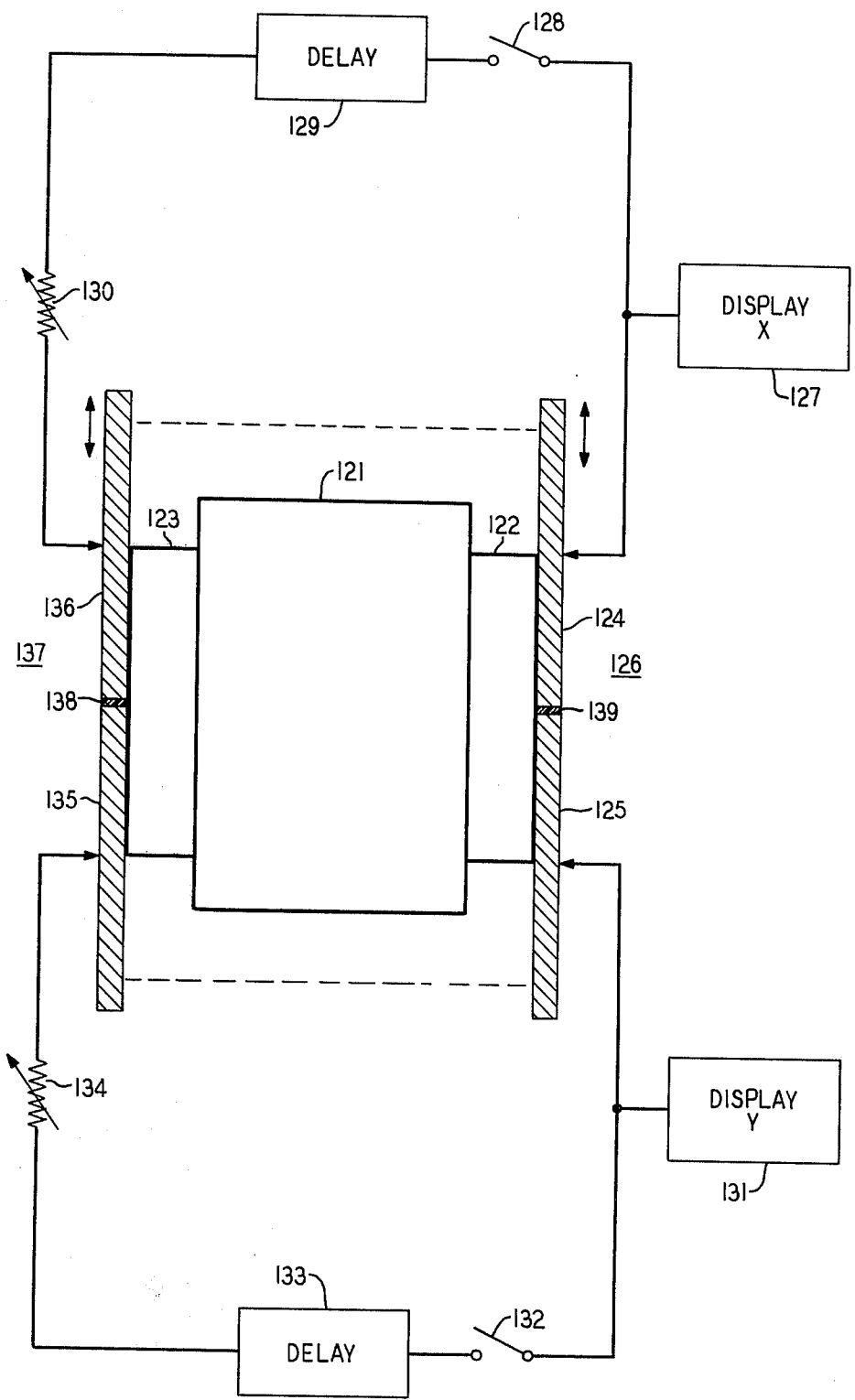
FIG. 13 is a simplified block diagram of two social group simulators having a sliding switch for disconnecting individual simulators from one social group simulator and connecting them to the other social group simulator.

FIG. 13 shows a configuration of the invention for simulations of groups having variable demographic composition. A group body is composed of simulator collection 121, fanin 123, and fanout 122 for simulating a neighborhood of Catholics and Protestants, for illustration. A neighborhood population composition selector composed of ganged slide switches 126 and 137 is varied according to an available or assumed Catholic/Protestant composition history. Conducting segments 124 and 136 connect a subgroup body of simulators of decisionmaking whether or not to be a practicing Catholic. A Catholicism display device 127 and a Catholicism feedback path including initializing switch 128, delay device 129 and variable resistor 130 are provided. Similarly, the balance of the individual simulators (Protestants) are connected by conducting segments 125 and 135 to Protestantism display device 131 and a Protestantism feedback path including initializing switch 132, delay device 133, and variable resistor 134. Conducting segment pairs 124, 125 and 135, 136 are separated by insulation spacers 138, 139 to provide electrical and social isolation between the groups. When switches 128 and 132 are closed the display devices 127 and 131 show the religious history of the neighborhood as it is executed in simulation.

In a feature of the apparatus of the invention of interest in the study of colonization and immigration, switch 128 can be closed and switch 132 can be open, with a minority of individual simulators being connected to display X at first, display Y being disregarded. As ganged sliders 124 and 136 are moved to progressively connect an increasing number of the simulators into communication along the feedback path for the group X, it will be seen that the initial social condition with small population exerts remarkable control over subsequent history.

In all cases, it is to be understood that many alternative forms of the invention are possible in light of the teachings herein. In particular, the interconnection schemes in the more complex forms of the invention do not merely contemplate electrical interconnection but analogous communication by whatever mode is convenient and suitable for practicing the invention. Adjustable decision voltage for varying the intensity of decisional output influence at the decision port is obtainable in a version of the invention. Mixtures of hierarchies and social groups employing individual simulators having multiple sense ports are useful in some embodiments of the invention. Multiple decision ports on the individual simulator units can be useful in certain embodiments. Apparatus and adjustment dials for conveniently controlling the statistical distribution of personal inclinations in a large body of individual simulators are helpful in a variety of inventive embodiments as well.

In educational applications of the present invention employing a large plurality of individual simulators, it is convenient to arrange them as shown in FIG. 14 as a social studies simulation laboratory or interpersonal relationship simulation laboratory. At least one individual simulator is located at each student desk 144. Power supply leads and leads from each decision port and each sense port are brought through cables 145, joined suitably into a master cable 146, into a central console 141 located at a teacher's desk. The central console 141 houses a central power supply, variable resistors, one or more individual simulators, initializing switches, ganged slide switches, plugboards and other devices for interconnecting the laboratory simulators in the various configurations according to the invention. One or more social condition display devices 142 are connected to the central console. When individual simulators having light emitting decision indicators (as in FIG. 1) are used, a convex or other mirror 143 is suitably used so that all of the decision indicators can be observed as a collectivity from any student desk 144.

The social simulation laboratory readily lends itself to student exercises elucidating fundamental principles and relational structures in social reality. In addition, experiments may be performed for investigating possible solutions for interpersonal, organizational, and social problems. Pure research on forms of interactive relationships hitherto unknown may even be envisioned in the course of the practice of the present invention.

What is claimed is:

1. Interpersonal relationship simulator apparatus comprising
    first adjustment dial means including an adjustable dial for indicating levels of a personal desire decisional influence for a first individual;
    an indicator for displaying one at a time of at least two decisions of said first individual;
    first device means adjustable by said first adjustment dial means, for causing said first decision indicator to display one decision when a total of decisional influence on said first individual exceeds a threshold and to display another decision when the total decisional influence on said first individual is less than said threshold, a physical output corresponding to each said decision being derivable;
    second adjustment dial means including an adjustable dial for indicating levels of a personal desire decisional influence for a second individual;
    an indicator for displaying one at a time of at least two decisions of said second individual;
    second device means adjustable by said second adjustment dial means, for causing said second decision indicator to display one decision when a total of decisional influence on said second individual exceeds a threshold and to display another decision when the total decisional influence on said second individual is less than said threshold, said physical output being able to cause an influence on said second device means in analogy with a decisional influence on said second individual; and
    means for substantially turning off said physical output influence,
    whereby the effect of interpersonal relationship is shown.

2. Interpersonal relationship simulator apparatus as claimed in claim 1 wherein
    said means for substantially turning off said physical output influence comprises means for interrupting transmission of said physical output to said second device means.

3. Interpersonal relationship simulator apparatus as claimed in claim 1 wherein
    said first adjustment dial means also includes an adjustable dial for indicating levels of a social expectation decisional influence for said first individual;
    said second adjustment dial means also includes an adjustable dial for indicating levels of a social expectation decisional influence for said second individual; and
    said means for substantially turning off said physical output influence comprises means for variably attenuating transmission of said physical output to said second device means, adjustable dial means being attached to said attenuating means for indicating levels of independence of said second individual from said first individual.

4. Interpersonal relationship simulator apparatus as claimed in claim 1 wherein
    said apparatus comprises a plurality of individual simulator units each unit comprising
    a sense port for admitting a physical force;
    adjustment dial means including an adjustable dial for indicating levels of a personal desire decisional influence for the individual simulated by the unit;

an indicator for displaying one at a time of at least two decisions of the individual simulated by the unit;

device means adjustable by said adjustment dial means, for causing said decision indicator to display one decision when a total of decisional influence on the individual simulated by the unit exceeds a threshold and to display another decision when the total decisional influence on the individual simulated by the unit is less than said theshold, a physical output corresponding to each said decision being derivable, said physical force being able to cause an influence on said device means in analogy with a decisional influence on the individual simulated by the unit;

means for substantially turning off said physical output; and a decision port at which said physical output is made available;

the sense port and decision port of each of said units communicating with a decision port and a sense port respectively of every other of said units, whereby reciprocal relationships are able to be simulated.

5. Interpersonal relationship simulator apparatus as claimed in claim 4 wherein said plurality is two and each unit further comprises means for variably attenuating said physical force; and adjustable dial means attached to said attenuating means for enabling indication of levels of emotional independence of the individual simulated by the unit from the individual simulated by the other unit; and said adjustment dial means in each unit also includes an adjustable dial for enabling the indication of levels of a social expectation decisional influence for the individual simulated by the unit.

6. Interpersonal relationship simulator apparatus as claimed in claim 5 wherein said decision indicators of said units indicate decisions in a man-woman relationship.

7. Interpersonal relationship simulator apparatus as claimed in claim 4 wherein said decision indicators of said units indicate decisions in a partnership.

8. Interpersonal relationship simulator apparatus as claimed in claim 1 wherein said apparatus comprises a plurality of individual simulator units each unit comprising a sense port for admitting a physical force;

adjustment dial means including an adjustable dial for indicating levels of a personal desire decisional influence for the individual simulated by the unit;

an indicator for displaying one at a time of at least two decisions of the individual simulated by the unit;

device means adjustable by said adjustment dial means, for causing said decision indicator to display one decision when a total of decisional influence on the individual simulated by the unit exceeds a threshold and to display another decision when the total decisional influence on the individual simulated by the unit is less than said threshold, a physical output corresponding to each said decision being derivable, said physical force being able to cause an influence on said device means in analogy with a decisional influence on the individual simulated by the unit; and a decision port at which said physical output is made available;

all of the decision ports of said units communicating along a common feedback path to all of the sense ports of said units;

and said turnoff means comprises means for substantially turning off said physical output corresponding to each said decision from communication along said feedback path to said sense ports;

said apparatus further comprising means for displaying a collective decisional output related to the physical output of each said unit.

9. Interpersonal relationship simulator apparatus as claimed in claim 8 wherein said turnoff means is switch means interposed in said feedback path.

10. Interpersonal relationship simulator apparatus as claimed in claim 8 wherein said feedback path includes time delay means.

11. Interpersonal relationship simulator apparatus as claimed in claim 8 wherein said feedback path includes nonlinear processing means.

12. Interpersonal relationship simulator apparatus as claimed in claim 11 wherein said nonlinear processing means comprises an individual simulator unit additional to said plurality of units and having a sense port communicating with a decision port side of said feedback path and also having a decision port communicating with a sense port side of said feedback path.

13. Interpersonal relationship simulator apparatus as claimed in claim 8 wherein some of the sense ports of said plurality of individual simulator units are connected in common to said feedback path by attenuation means.

14. Interpersonal relationship simulator apparatus as claimed in claim 8 wherein said apparatus further comprises means for including a variable number of individual simulator units in communication along said feedback path.

15. Interpersonal relationship simulator apparatus as claimed in claim 8 wherein said decision ports and said sense ports also communicate with the sense ports and decision ports respectively of a second interpersonal relationship simulator apparatus of the kind claimed in claim 8.

16. Interpersonal relationship simulator apparatus as claimed in claim 8 having first decision ports and first sense ports wherein said apparatus further comprises second simulator apparatus of the kind claimed in claim 8 having second decision ports and second sense ports, said first decision ports communicating to said second sense ports and said second decision ports communicating to said first sense ports via respective crossloops, each of said crossloops having means for substantially turning off communication along the crossloop, time delay means; and means for obtaining a biased physical output corresponding to collective decisional output, whereby conflicts are able to be simulated.

17. Interpersonal relationship simulator apparatus as claimed in claim 1 wherein said apparatus further comprises at least one additional simulator unit, each such additional unit comprising adjustment dial means including an adjustable dial for indicating levels of a personal desire decisional influence for an additional individual simulated by the unit;

an indicator for displaying one at a time of at least two decisions of said additional individual simulated by the unit; and device means adjustable by said adjustment dial means, for causing said decision indicator to display one decision when a total of decisional influence on said additional individual simulated by the unit exceeds a threshold and to display another decision when the total decisional influence on said additional individual simulated by the unit is less than said threshold; the physical output recited in claim 1 being able to cause an influence on said device means of each such additional unit in analogy with a decisional influence on each said additional individual simulated by each such additional unit.

18. Interpersonal relationship simulator apparatus as claimed in claim 1 wherein with respect to said second device means a second physical output corresponding to each said decision of said second individual is derivable; and said apparatus further comprises third adjustment dial means including an adjustable dial for indicating levels of a personal desire decisional influence for a third individual;

an indicator for displaying one at a time of at least two decisions of said third individual;

third device means adjustable by said third adjustment dial means, for causing said third decision indicator to display one decision when a total of decisional influence on said third individual exceeds a threshold and to display another decision when the total decisional influence on said third individual is less than said threshold, said second physical output being able to cause an influence on said third device means in analogy with a decisional influence on said third individual; and means for substantially turning off said second physical output influence, whereby the effect of a hierarchy of interpersonal relationship is shown.

19. Interpersonal relationship simulator apparatus as claimed in claim 18 wherein each said decision indicator displays a decision relating to business in a hierarchial organization.

20. Interpersonal relationship simulator apparatus as claimed in claim 1 wherein said apparatus further comprises at least one additional simulator unit, each such additional unit comprising adjustment dial means including an adjustable dial for indicating levels of a personal desire decisional influence for an additional individual simulated by said unit;

an indicator for displaying one at a time of at least two decisions of said additional individual; and device means adjustable by said adjustment dial means, for causing said decision indicator to display one decision when a total of decisional influence on said additional individual exceeds a threshold and to display another decision when the total decisional influence on said additional individual is less than said threshold, an additional physical output corresponding to each said decision being derivable;

each decision indicator of each additional unit and the first decision indicator being such as to relate to the same decisions, said physical output influence in claim 1 being caused by contributions from said physical output and said additional physical output of each additional simulator unit.

21. For use in an interpersonal relationship simulator an individual simulator comprising a sense port for admitting a physical force;

means for variably attenuating said physical force;

adjustable dial means attached to said attenuating means for enabling indication of levels of independence of said individual from at least one other individual;

an adjustable dial for enabling indication of levels of a personal desire decisional influence for said individual;

an indicator for displaying one at a time of at least two decisions of said individual;

device means adjustable by said desire dial, for causing said decision indicator to display one decision when a total of decisional influence on said individual exceeds a threshold and to display another decision when the total decisional influence on said individual is less than said threshold, said physical force being able to cause an influence on said device means in analogy with a decisional influence on said individual;

means for deriving a physical decision force having amounts corresponding to at least two decisions of said individual;

means for interrupting said physical decision force; and a decision port at which said physical decision force is made available.

22. An interpersonal relationship simulator laboratory comprising a plurality of individual simulators each as claimed in claim 21 and means for interconnecting the sense ports and the decision ports of said individual simulators to form an interpersonal relationship simulator.

23. An interpersonal relationship simulator laboratory as claimed in claim 22 wherein at least some of said individual simulators are located at student desks, said decision indicators are light emissive, said laboratory includes mirror means for facilitating observation of said light emissive decision indicators, and said interconnecting means is located at a teacher desk.

24. A man-woman relationship simulator comprising a power supply for providing a positive supply voltage and a negative supply voltage with respect to a ground;

a man-simulator and a woman-simulator apparatus each comprising an adjustment dial for indicating levels of personal desire, said desire dial being attached to a desire potentiometer connected from said negative to said positive voltage and having a wiper electrically connected to a variable resistance attached to an adjustment dial for indicating levels of attention to own desire;

an adjustment dial for indicating levels of social expectations, said social expectation dial being attached to a social expectation potentiometer connected from said negative to said positive voltage and having a wiper electrically connected to a variable resistance attached to an adjustment dial for indicating levels of compliance with society;

an adjustment dial for indicating levels of emotional independence from partner, said dial being attached to an emotional independence variable resistance having a first end and a second end;

threshold detector means having an input connected to said desire attention variable resistance, to said compliance variable resistance, and to said second end of said emotional independence variable resistance;

means responsive to said threshold detector for causing display of alternative decisions, said display causing means indicating one decision if a voltage at said input exceeds a threshold and indicating another decision if said input voltage does not exceed said threshold; and means for deriving a decision voltage having one polarity when said input voltage exceeds said threshold and having the opposite polarity when said input voltage does not exceed said threshold;

said decision voltage of said man-simulator being delivered to said first end of said emotional independence variable resistance of said woman-simulator; and said decision voltage of said woman-simulator being delivered to said first end of said emotional independence variable resistance of said man-simulator.

25. The man-woman relationship simulator as claimed in claim 24 wherein said decision voltage deriving means includes polarity reversing switch means.

26. The man-woman relationship simulator as claimed in claim 24 wherein said threshold detector means comprises a first transistor having an emitter connected by a conducting path to said ground, a base being said input, and a collector connected to said display causing means.

27. The man-woman relationship simulator as claimed in claim 26 wherein said display causing means comprises a collector resistor connected from said first transistor collector to said power supply, a series resistor connected from said transistor collector to the base of an amplifier transistor, said amplifier transistor having an emitter connected to said power supply and a collector connected to one end of a relay, the other end of said relay being connected to ground, said relay having contacts for connecting said power supply alternatively to respective decision indicating light emitting devices.

28. The man-woman relationship simulator as claimed in claim 26 wherein said display causing means includes relay means having contacts for connecting a side of said power supply having one polarity alternatively to decision indicating incandescent light bulbs; and said decision voltage deriving means comprises first and second resistances connected at a junction, said first resistance being electrically connected to one of said relay contacts and said second resistance also being electrically connected to the opposite polarity side of said power supply, whereby said decision voltage appears at said junction.

29. Interpersonal relationship simulator apparatus as claimed in claim 1 wherein said apparatus further comprises means for providing a variety of situational interpretations to said adjustment dial means and said decision indicators.

30. Interpersonal relationship simulator apparatus comprising first adjustment means including first means for indicating first levels of decisional influence for a first simulated individual;

first indicator means for displaying one at a time of at least two decisions of said first individual;

second adjustment means including second means for indicating second levels of decisional influence for a second simulated individual;

second indicator means for displaying one at a time of at least two decisions of said second individual;

and device means for (A) causing said first decision indicator means to display one first individual decision when a total of decisional influence on said first individual, including said first levels and an influence due to said decisions of said second individual, exceeds a threshold and to display another first individual decision when the total of decisional influence on said first individual is less than said threshold and (B) causing said second decision indicator means to display one second individual decision when a total of decisional influence on said second individual, including said second levels and an influence due to said decisions of said first individual, exceeds a threshold and to display another second individual decision when the total of decisional influence on said second individual is less than said threshold, said device means including means for also enabling the indication of the decision which would be made by said first individual in substantial isolation from said second individual decisions influence.

31. Interpersonal relationship simulator apparatus as claimed in claim 30 wherein said first and second adjustment means also respectively include first and second means for adjusting and indicating levels relating to attention to or compliance with said decisional influences for said first and second simulated individuals.

32. Interpersonal relationship simulator apparatus as claimed in claim 30 wherein said isolation decision means also includes means for variably attenuating at least said influence due to said decisions of said second individual and said attenuating means has adjustment and indication means for setting levels of emotional independence.

33. Interpersonal relationship simulator apparatus as claimed in claim 30 wherein said isolation decision enabling means comprises means for substantially turning off at least said influence due to said decisions of said second individual.

34. Interpersonal relationship simulator apparatus as claimed in claim 30 wherein said first and second adjustment means also respectively include first and second means for adjusting and indicating levels relating to attention to or compliance with said decisional influences for said first and second simulated individuals;

said isolation decision enabling means includes first means for variably attenuating at least said influence due to said decisions of said second individual and said first attenuating means has first adjustment and indication means for setting levels of first emotional independence; and said device means further includes means for enabling the indication of the decisions which would be made by said second individual in substantial isolation from said first individual decision output influence including second means for variably attenuating at least said influence due to said decisions of said first individual and said second attenuating means has second adjustment and indication means for setting levels of second emotional independence.

35. Interpersonal relationship simulator apparatus as claimed in claim 30 wherein said apparatus further comprises means for providing changeable interpretations for at least said first and second adjustment means.

36. Interpersonal relationship simulator apparatus as claimed in claim 30 wherein said device means comprises
first and second source means of first and second electrical decisional influence voltages respectively adjustable by said first and second adjustment means;
means for providing first and second decision voltages depending on said decisions of said first and second individuals;
first means for combining said first decisional influence voltage and said second decision voltage and causing said first decision indicator means to display said one first individual decision when said voltage so combined exceeds a first voltage threshold and to display said other first individual decision when said voltage so combined is less than said first voltage threshold;
second means for combining said second decisional influence voltage and said first decision voltage and causing said second decision indicator means to display said one second individual decision when said voltage so combined exceeds a second voltage threshold and to display said other second individual decision when said voltage so combined is less than said second voltage threshold; and
said isolation decision enabling means comprises means for substantially turning off at least said second decision voltage from said first combining means.

37. Interpersonal relationship simulator apparatus as claimed in claim 36 wherein said first and second adjustment means each comprise adjustment dials which indicate a form of personal desire and a form of social pressure.

38. Interpersonal relationship simulator apparatus as claimed in claim 37 wherein said apparatus further comprises variable resistance means, connected between said first and second decisional influence voltage source means and said first and second combining means respectively, said variable resistance means being attached to adjustment dial means for substantially indicating attention to own desire and compliance with society for said first individual and attention to own desire and compliance with society for said second individual respectively.

39. Interpersonal relationship simulator apparatus as claimed in claim 36 wherein said first and second combining means comprise
resistances respectively connected to said first and second decisional influence voltage sources and said first and second decision voltage providing means, at least one of said resistances being variable, each said variable resistance being attached to a respective adjustment dial means for substantially indicating levels of independence from or compliance with the respective decision or decisional influence; and
threshold level detector means connected to said resistances, said decision indicator means indicating and said decision voltage means acting in response to said threshold level detector means.

40. Interpersonal relationship simulator apparatus as claimed in claim 36 wherein said first and second decision voltages have alternative voltage values depending on said decisions of said first and second individuals and said decision voltage providing means includes means for manually reversing the alternative voltage values provided for each individual, said reversing means being associated with means for indicating an agreeable or contrary type of influence of each individual upon the other.

41. Interpersonal relationship simulator apparatus comprising
a first decisionmaking simulation apparatus comprising
first adjustment means for indicating at least one decisional influence for a first simulated individual;
first indicator means for displaying one at a time of a plurality of decisions of said first individual;
and first device means for operating said first decision indicator means in response to said first adjustment means, a physical output corresponding to each said decision being derivable;
and a second decisionmaking simulation apparatus comprising
second adjustment means including means for indicating levels of decisional influence for a second simulated individual;
second indicator means for displaying one at a time of at least two decisions of said second individual;
second device means, adjustable by said second adjustment means, for causing said second decision indicator means to display one decision when a total of decisional influence on said second individual exceeds a threshold and to display another decision when the total decisional influence on said second individual is less than said threshold, said physical output being able to cause an influence on said second device means in analogy with a decisional influence on said second individual; and
means for substantially turning off said physical output influence,
whereby the effect of interpersonal relationship between said first and second simulated individuals is shown.

42. Social group simulation apparatus comprising
a simulator of individual decisionmaking comprising
adjustment means including first means for indicating first levels of a personal desire decisional influence for an individual;
indicator means for displaying one at a time of at least two decisions of said individual;
and device means adjustable by said adjustment means for causing said decision indicator means to display one decision when a total of decisional influence on said individual is greater than a threshold and to display another decision when the total decisional influence on said individual is less than said threshold, a first physical output corresponding to each said decision being derivable, said device means including means for substantially turning off said physical output; and
social group body simulation means comprising a plurality of simulation units;

a fanin comprising input resistances to said units, said input resistances being adjustable in statistical distribution, said first physical output being communicated to said fanin; and a fanout comprising a common connection to a decisional output of each of said simulation units, said fanout being adapted for bearing a common physical output for causing a physical influence on said device means analogous to a decisional influence.

43. Social group simulation apparatus as claimed in claim 42 wherein said fanout also is able to communicate with said fanin.

44. Social group simulation apparatus as claimed in claim 42 wherein said social group body simulation means further comprises personal desire decisional influence voltage source means connected to each of said simulation units.

45. Interpersonal relationship simulator apparatus comprising a first decisionmaking simulation apparatus adjustably indicating levels of one or more decisional influences upon a first simulated individual and displaying simulated decisions resulting from an action of forces in said first apparatus corresponding to said first decisional influences, a physical decision output being available from said first apparatus; and a second decisionmaking simulation apparatus adjustably indicating levels of one or more decisional influences upon a second simulated individual and displaying second simulated decisions, said physical decision output from said first apparatus causing an influence on said second apparatus in analogy with a decisional influence upon said second simulated individual, said second simulated decisions resulting from an action of forces in said second apparatus corresponding to said second decisional influences, whereby the simulation of interpersonal relationships is facilitated.

* * * * *

UNITED STATES PATENT OFFICE
CERTIFICATE OF CORRECTION

Patent No. 4,009,525         Dated March 1, 1977

Inventor(s)  James Fisher Hollander

It is certified that error appears in the above-identified patent and that said Letters Patent are hereby corrected as shown below:

Column 2, line 7, "and" should read -- that --.

Column 8, line 10, "as" should read -- was --.

Column 8, line 63, after "(300K)" insert -- ) --.

Column 9, line 35, "man" should read -- manner --.

Column 22, line 41, in claim 32, after "decision" insert -- enabling --.

Signed and Sealed this twelfth Day of July 1977

[SEAL]

Attest:

RUTH C. MASON
*Attesting Officer*

C. MARSHALL DANN
*Commissioner of Patents and Trademarks*